3,400,152
SULFONAMIDES AND SULFONIMIDES
Dale G. Block, Cleveland, Raymond E. Bailey, Mentor, and Jack L. Towle, East Cleveland, Ohio, assignors, by mesne assignments, to Kewanee Oil Company, Bryn Mawr, Pa., a corporation of Delaware
No Drawing. Filed June 25, 1964, Ser. No. 378,048
19 Claims. (Cl. 260—556)

ABSTRACT OF THE DISCLOSURE

This invention comprises new sulfoamide and sulfonimide compounds having at least one alkynyl radical attached to the nitrogen of benzenesulfonamide or benzenesulfonimide or derivative thereof. These compounds are represented by the formula

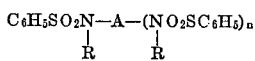

wherein $n$ is 0 or 1. When $n$ is 0, A represents various monovalent radicals as defined hereinafter, and when $n$ represents 1, A represents a divalent radical as defined hereinafter. These compounds have an alkynyl radical in either the R or A group, and are useful as plasticizers or brighteners in nickel electroplating baths. Typical compounds of this invention are N-propargylbenzenesulfonamide, N,N-bis(1-(4-hydroxybutyne-2))benzenesulfonamide, etc.

---

This invention relates generally to sulfoamides and sulfonimides having at least one triple bond-containing radical attached to the nitrogen and more particularly the invention relates to N-alkynylarylsulfonamides and N-alkynylarylsulfonimides.

The compounds of the present invention may be defined by the following general formula:

I 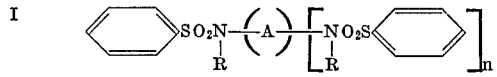

wherein $n$ is an integer from 0 to 1 inclusive; with the proviso $n$ is 0, A represents a monovalent radical selected from the group consisting of hydrogen, alkyl, aralkyl, alkenyl, alkynyl, alkylcarbonyl, arylcarbonyl and arylsulfonyl, and R represents a radical selected from the group consisting of alkynyl and substituted alkynyl; and with the proviso $n$ is 1, A represents a divalent radical selected from the group consisting of alkynylene, p,p'-bis(sulfonyl) bi-phenylene and p,p'-oxy-bis(arylsulfonyl) and R represents a radical selected from the group consisting of alkynyl and substituted alkynyl and R may also represent hydrogen when A represents an alkynylene group.

The compounds defined by Formula I are prepared by the classical reaction of an alkynyl halide with benzenesulfonamide or a compound having a radical derived from benzenesulfonamide according to the following equation where, for purposes of illustration benzenesulfonamide (sodium salt) is employed as the sulfonamide and propargyl bromide is employed as the alkynyl halide.

II
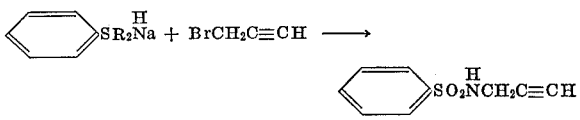

The above reaction is carried out conveniently in a polar solvent using any of the alkynyl halides including the bromine, and chlorine derivatives thereof or the alkynylarylsulfonates, such as the benzenesulfonate, and the like. The temperature at which the reaction is carried out may be anywhere within the range of from about 75° C. to about 120° C. and more preferably 95° C. to 100° C. Where the reaction is carried out using the longer chain alkynyl groupings, the higher temperatures are, of course, more advantageous.

Examples of polar solvents particularly useful as a medium for carrying out the instant reaction include dimethylformamide, dioxane, tetrahydrofuran, dimethylacetamide, 1, 2-dimethoxyethane, dibutyl ether, and the like.

Specific compounds useful as reactants with the sulfonamide nucleus and the sulfoimide nucleus to prepare compounds coming within the scope of Formula I include 1,4-dichlorobutyne-2, 1-bromopropyne (propargyl bromide), 1-chlorobutyne, 1-chloro-4-hydroxybutyne-2, 1-chloro-5-hydroxypentyne-2, 1-chloro-6-hydroxyhexyne-2, 1-bromo-7-hydroxyheptyne-2, 2-chloro-5-hydroxypentyne-3 and the like.

Characterizing the compounds of the present invention is the substituted alkynyl group attached directly to the nitrogen atom of the sulfonamide or the sulfonimide group. By alkynyl group is meant a continuous hydrocarbon chain containing the alkynyl triple bond; the chain comprising the alkynyl group accordingly is free from divalent linking atoms such as nitrogen, oxygen, sulfur and the like. Preferably the alkynyl group comprises 3 to 4 carbon atoms but may contain as many as 8 carbon atoms.

As mentioned hereinbefore the reaction is carried out using the sodium salt of a sulfonamide or a sulfonimide and a substituted or unsubstituted alkynyl halogenide chosen to combine the corresponding alkynyl grouping with the sulfonamide or sulfonimide. Indicated by the above listed representative examples of reactants the alkynyl group may contain certain radicals at various positions along the alkynyl chain. Radicals that may be present on the chain include halo (chloro, bromo and iodo) hydroxyl and the like.

The compounds embraced by Formula I may be broken down sub-generically in the following general formulas:

The substituted benzenesulfonamides themselves:

III 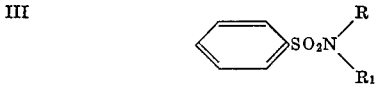

wherein R has the same meaning as defined above and $R_1$ is a monovalent radical selected from the group consisting of hydrogen, alkyl, aralkyl, alkenyl and alkynyl:

IV 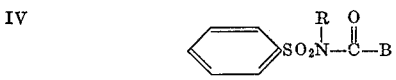

wherein R has the same meaning as defined above and B is a radical selected from the group consisting of lower alkyl (1–6 carbon atoms), aryl and alkaryl;

The substituted dibenzenesulfonimides:

V 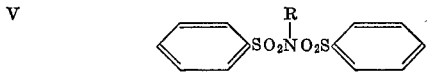

wherein R has the same meaning as defined above; and

The bis(benzenesulfonamides) and bis(benzenesulfonimides):

VI 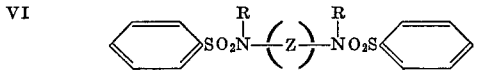

wherein R has the same meaning as defined above and Z has the same meaning as A when $n$ is 1, representing a divalent radical selected from the group consisting of alkynylene, p,p'-bis(sulfonyl) biphenylene and p,p'-oxy-bis(arylsulfonyl).

Generally the compounds embraced by Formula III include the mono- and dialkynyl substituted benzenesulfonamides although the toluene and xylene homologues may be used.

The compounds embraced by Formula IV include the phenylsulfonylaryl amides where B represents a mononuclear aryl radical such as a phenyl, tolyl or xylyl radical; and phenylsulfonylalkyl amides where B represents a lower alkyl radical such as methyl, ethyl, propyl, butyl and the like.

The compounds embraced by Formula V include the diarylsulfonimides where the aryl radical while preferably being phenyl may be tolyl or xylyl.

The compounds embraced by Formula VI include the bis(arylsulfonamides) and the bis(arylsulfonimides) where the aryl radical may be tolyl or xylyl in addition to phenyl and where Z represents divalent alkynylene radicals such as ethynylene, propynylene, butynylene and the like; and the p,p'-bis(sulfonyl)biarylene radicals such as bis(benzenesulfonyl)-4 and the like; and the p,p'-oxy-bis(arylsulfonyl) radicals such as p,p'-oxy-bis(benzenesulfonyl) and the like.

In order that those skilled in the art may better understand how the present invention can be carried into effect, the following examples are given by way of illustration and not by way of limitation. All parts and percentages are by weight unless otherwise specified.

EXAMPLE I

Preparation of N,N-dipropargylbenzenesulfonamide.—Into a suitable vessel, equipped with stirrer, thermometer and reflux condenser with drying tube is charged 35.8 grams (0.2 mole) of sodium benzenesulfonamide and 300 cc. of hot absolute methanol. The mixture is refluxed (65° C.) until all the sodium benzenesulfonamide has dissolved and cooled slightly to 60° C. 39.2 grams (0.2 mole) propargyl benzenesulfonate is then added (all at once) to the vessel, turning the methanol solution a clear yellow. The resulting reaction mass is brought to reflux again and held for one and three-quarter hours during which time a fine white crystalline product is precipitated (sodium benzenesulfonate) from the solution. The mixture is cooled to room temperature and poured into a large excess of ice water. The white precipitate which separates is filtered, washed thoroughly with water (to remove excess sodium benzenesulfonamide and sodium benzenesulfonate) and dried until most of the water has evaporated. The product was recrystallized (from 95 percent ethanol), washed with fresh ethanol and air dried to constant weight.

The properties of the crystallized product are as follows:

Melting point, 87° C. to 89° C.
Color, white (needles)
Nitrogen (percent): found, 5.99; theoretical, 6.01

| Infra red bands, cm.⁻¹ | Groups indicated |
|---|---|
| 2,100, 3,300 | Terminal acetylenic (—C≡CH) |
| 1,160, 1,340 | Sulfonamide (—SO₂N) |
| 710, 745 | Phenyl 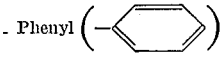 |

EXAMPLE II

Preparation of 1-hydroxy-4-benzenesulfonamidobutyne-2.—Into a suitable vessel equipped with magnetic stirrer, thermometer and reflux condenser is charged 19.7 grams (0.11 mole) sodium benzenesulfonamide and 100 cc. of dimethylformamide. 10.5 grams (0.1 mole) 1-chloro-4-hydroxybutyne-2 is then added and the temperature rises from about 25° C. to 40° C. turning the dimethylformamide solution orange. The resulting reaction mass is heated to 100° C. for 2 hours during which time the solution changes in color from an orange to milky dark brown (NaCl separating). The brown mixture is concentrated in vacuo by removing most of the dimethylformamide and the residue poured into excess ice water. The brown solid which separates is filtered, washed with cold water and air dried to constant weight. The product was recrystallized from methanol and dried.

The properties of the crystallized product are as follows:

Melting point, 73° C. to 74° C.
Color, orange
Nitrogen (percent): found, 6.03; theoretical, 6.22

| Infra red bands, cm.⁻¹ | Groups indicated |
|---|---|
| 1,000, 3,350 | Primary hydroxyl (—C(H)(H)—OH) |
| 3,280 | Amide nitrogen (NH) |
| 1,163, 1,350 | Sulfonamide (—SO₂N) |
| 690, 750 | Phenyl  |

EXAMPLE III

Preparation of 1,4 - bis(benzenesulfonamide) butyne-2.—Into a suitable vessel equipped with magnetic stirrer, thermometer, reflux condenser and a dropping funnel is charged 39.4 grams (0.22 mole) sodium benzenesulfonamide, 150 cc. of methanol and 50 cc. of water. The mixture is then heated (to about 60° C.) until substantially all of the sodium benzenesulfonamide goes into solution. While maintaining the temperature in the range of about 60–63° C., 12.3 grams (0.1 mole) of 1,4-dichlorobutyne-2 is added dropwise to the vessel over a 15 minute period. The resulting reaction mass is then refluxed for 3 hours at a temperature in the range of 65°–70° C., during which time a white crystalline precipitate (NaCl) separates from solution. The mixture is cooled to 30° C. and poured into an excess of ice water. The yellow precipitate which separates is filtered, washed with water and air dried. The product is extracted with hot benzene and the benzene is cooled. The precipitated product is filtered, dried and crystallized twice from aqueous methanol.

The properties of the product are as follows:

Melting point, 135° C. to 137° C.
Color, cream (plates)

| Infra red bands, cm.⁻¹ | Groups indicated |
|---|---|
| 1,163, 1,333 | Sulfonamide (—SO₂N) |
| 690, 753 | Phenyl  |

EXAMPLE IV

Preparation of p,p'-oxy-bis (N-propargyldibenzenesulfonamide).—Into a suitable vessel equipped with magnetic stirrer, thermometer, reflux condenser and a dropping funnel is charged 32.6 grams (0.05 mole) of the disodium salt of p,p'-oxy-bis(dibenzenesulfonamide) dissolved in 75 cc. of dimethylformamide. 14.3 grams (0.12 mole) propargyl bromide is added dropwise over a 15 minute period, to the clear water white dimethylformamide solution which turns yellow-orange in color. The resulting reaction mass is then heated to 80–90° C. for one-half hour and allowed to stand overnight. The solution is poured into ice water and after a few minutes a fine white precipitate separates. After filtering and drying to a constant weight, the product is recrystallized from aqueous methanol and again dried to constant weight.

The properties of the crystallized product are as follows:

Melting point, 184° C.–187° C.
Color, white (powder)
Carbon (percent): found, 52.32; theoretical, 52.70

Hydrogen (percent): found, 3.54; theoretical, 3.51
Nitrogen (percent): found, 4.01; theoretical, 4.10

| Infra red bands, cm.⁻¹ | Groups indicated |
| --- | --- |
| 2,140, 3,250 | Terminal acetylenic (—C≡CH) |
| 1,160, 1,368 | Sulfonamide (—SO₂N) |
| 1,245 | p,p'-Oxy-bis(phenyl) 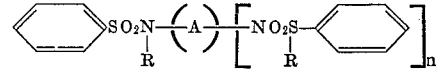 |
| 805 | Paraphenylene |
| 690, 715 | Phenyl |

EXAMPLE V

Preparation of N-propargyldibenzenesulfonimide.—Into a suitable vessel equipped with magnetic stirrer, thermometer and reflux condenser is charged 67 grams (0.2 mole) of the sodium salt of dibenzenesulfonimide and 23.8 grams (0.2 mole) of propargyl bromide with 100 cubic centimeters of dimethylformamide as the solvent. The hazy pale, brown solution is heated to a temperature kept in the range of from 95° C. to 100° C. for 3 hours. The solution is then cooled to 30° C. and allowed to stand overnight. The solution is poured into an excess of ice water. The white crystalline solid which forms is filtered, washed with water and dried to a constant weight in ethanol.

The properties of the crystallized product are as follows:

Melting point, 87° C.–88° C.
Color, white
Nitrogen (percent): found, 4.04; theoretical, 4.18

The compounds defined by Formula I are peculiarly useful as plasticizers in thermoplastic resins. Particularly, these compounds of the present invention may be used as plasticizers in vinyl resins. Minor amounts (1–5%) have been found as effective first class plasticizers in the production of vinyl sheet, particularly clear or transparent sheet.

The following Examples A through C illustrate the plasticizing of polyvinyl chloride resin utilizing the instant compounds.

EXAMPLE A 100 grams of a vinyl chloride resin (Geon 8640) are banded at a 25 mil setting on hot oil filled rolls kept at 280° F. Five (5) percent of the compound prepared according to Example V (N-propargyldibenzenesulfonamide) was then added over a 45 minute period slowly to the banded resin. Following the addition there was a constant "cutting and folding" performed on the band for a 10 minute period while the rolls were maintained at about 280° F. While the resin band still was soft, it was removed by cutting the band longitudinally along one of the rolls and parallel to the axis of the roll. After cooling the band was as clear as a sheet of resin not having any additions made.

EXAMPLE B

Using 4 percent of the compound prepared according to Example III another 100 gram sample of Geon 8640 was mixed intimately therewith following substantially the identical procedure set forth in Example A. After cooling, the band or sheet of resin remained clear.

The following example is given by way of comparison:

EXAMPLE C 5 grams of Santicizer 9 (toluene sulfonamide, ortho and para isomer mixtures) was intimately mixed with 100 grams of Geon 8640 following the procedure outlined in Example A.

The band or sheet of resin was clear immediately after mixing but became whitened as the band of resin cooled.

The compounds embraced by Formula III in addition to being good plasticizers may be used advantageously as brighteners in nickel electroplating baths.

While specific examples of the invention have been set forth hereinabove, it is not intended that the invention be limited solely thereto, but to include all of the variations and modifications falling within the scope of the appended claims.

What is claimed is:
1. A chemical compound of the structure:

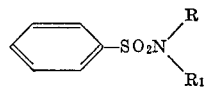

wherein $n$ is an integer from 0 to 1 inclusive, provided that when $n$ is 0, A represents a monovalent radical of no more than 8 carbon atoms selected from the group consisting of hydrogen, alkyl, phenyl, tolyl, xylyl, alkynyl of 4–7 carbon atoms, alkylcarbonyl, phenylcarbonyl, tolylcarbonyl, xylylcarbonyl, phenylsulfonyl, tolylsulfonyl and xylylsulfonyl and R represents a radical selected from the group consisting of alkynyl and substituted alkynyl wherein said alkynyl and substituted alkynyl contain from 3–7 carbon atoms and the substituent on the substituted alkynyl is selected from the group consisting of hydroxyl, chloride, bromide, and iodide; and provided further that when $n$ equals 1, A represents a divalent radical selected from the group consisting of alkynylene of 2–7 carbon atoms, p,p'-bis (sulfonyl) biphenylene and p,p'-oxy-bis (phenylsulfonyl) and R represents a radical selected from the group consisting of alkynyl and substituted alkynyl, said alkynyl and substituted alkynyl having from 3–7 carbon atoms and the substituent on the substituted alkynyl is selected from the group consisting of hydroxyl, chloride, bromide and iodide; and when A represents an alkynylene radical R may also represent hydrogen.

2. The chemical compound of claim 1 wherein $n$ is 0.
3. The chemical compound of claim 1 wherein $n$ is 1.
4. A chemical compound of the structure

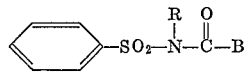

wherein R represents a monovalent radical selected from the group consisting of alkynyl and substituted alkynyl wherein said alkynyl and substituted alkynyl contain from 3–7 carbon atoms and the substituent on the substituted alkynyl is selected from the group consisting of hydroxyl, chloride, bromide and iodide and $R_1$ represents a monovalent radical selected from the group consisting of hydrogen, alkyl having up to 8 carbon atoms and alkynyl having 4–7 carbon atoms.

5. N-propargylbenzenesulfonamide.
6. 1-hydroxy-4-benzenesulfonamidobutyne-2.
7. N,N - bis[1 - (4 - hydroxybutyne - 2)]benzenesulfonamide.
8. A chemical compound of the structure

wherein R represents a monovalent radical selected from the group consisting of alkynyl and substituted alkynyl wherein said alkynyl and substituted alkynyl have from 3–7 carbon atoms and the substituent on the substituted alkynyl is selected from the group consisting of hydroxyl, bromide, chloride and iodide and B is a radical selected from the group consisting of alkyl of up to 6 carbon atoms, phenyl, tolyl and xylyl.

9. N-propargyl-N-phenylsulfonylacetamide.
10. N - acetyl - N - [1 - (4 - hydroxybutyne - 2)]benzenesulfonamide.

11. N-propargyl-N-phenylsulfonylbenzamide.
12. A chemical compound of the formula

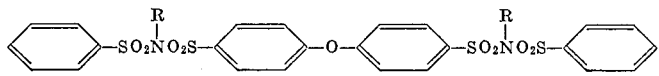

wherein R represents a monovalent radical selected from the group consisting of alkynyl and substituted alkynyl wherein said alkynyl and substituted alkynyl contain from 3–7 carbon atoms and the substituent on the substituted alkynyl is selected from the group consisting of hydroxyl, chloride, bromide and iodide.

13. p,p'-Oxy-bis(N-propargyldibenzenesulfonimide).
14. p,p' - Oxy - bis[N - (4 - hydroxybutynyl - 2)dibenzenesulfonamide].
15. N-(4-hydroxybutynyl-2)dibenzenesulfonimide.
16. A chemical compound of the structure

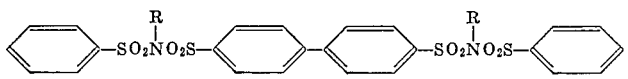

wherein R represents a monovalent radical selected from the group consisting of alkynyl and substituted alkynyl wherein said alkynyl and substituted alkynyl contain from 3–7 carbon atoms and the substituent on the substituted alkynyl is selected from the group consisting of hydroxyl, chloride, bromide and iodide.

17. N,N' - dipropargyl - N,N' - bis(phenylsulfonyl)-4,4'-biphenyldisulfonamide.
18. N,N' - bis[bis(4 - hydroxybutynyl - 2)] - N,N'-bis(phenylsulfonyl)-4,4'-biphenyldisulfonamide.
19. A chemical compound of the structure

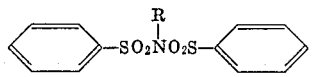

wherein R represents a radical selected from the group consisting of alkynyl and substituted alkynyl wherein said alkynyl and substituted alkynyl contain from 3–7 carbon atoms and the substituent on the substituted alkynyl is selected from the group consisting of hydroxyl, chloride, bromide and iodide.

No references cited.

HENRY R. JILES, *Primary Examiner.*

H. I. MOATZ, *Assistant Examiner.*